US006360322B1

United States Patent
Grawrock

(10) Patent No.: US 6,360,322 B1
(45) Date of Patent: Mar. 19, 2002

(54) AUTOMATIC RECOVERY OF FORGOTTEN PASSWORDS

(75) Inventor: David Grawrock, Aloha, OR (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/162,102

(22) Filed: Sep. 28, 1998

(51) Int. Cl.[7] .................................................. G06F 1/26
(52) U.S. Cl. ........................ 713/176; 713/180; 713/182; 380/255; 380/277
(58) Field of Search ................................ 380/255, 277, 380/283; 713/155, 168, 170, 171, 176, 180, 182

(56) References Cited

U.S. PATENT DOCUMENTS

| 5,719,941 | A | | 2/1998 | Swift et al. ..................... 380/25 |
|---|---|---|---|---|
| 5,768,373 | A | | 6/1998 | Lohstroh et al. ................ 380/4 |
| 5,923,756 | A | * | 7/1999 | Shambroom ................. 380/21 |
| 5,953,422 | A | * | 9/1999 | Angelo et al. ................. 380/23 |
| 5,995,624 | A | * | 11/1999 | Fielder et al. ................. 380/25 |
| 6,061,790 | A | * | 5/2000 | Bodnar ........................ 713/171 |
| 6,105,133 | A | * | 8/2000 | Fielder et al. ............... 713/169 |

FOREIGN PATENT DOCUMENTS

| WO | WO 97/46933 | 12/1997 |
|---|---|---|

* cited by examiner

Primary Examiner—Thomas R. Peeso
(74) Attorney, Agent, or Firm—Fliesler, Dubb, Meyer & Lovejoy LLP

(57) ABSTRACT

In accordance with the invention a method of securely and automatically authenticating a user is disclosed. Bona fides are entered for a user, hashed, and stored at an authenticating entity, remote from the user's computer. When a user forgets his/her password, the user enters his/her bona fides, which are again hashed on the user's system, and then securely transmitted to the authenticating entity. The authenticating entity compares the received, hashed bona fides to those previously stored at the authenticating entity. If the comparison shows that the values match or otherwise appropriately correlate, the user will be authenticated. The user will then be provided with the means to access his/her encrypted data. In other words, once authenticated the authenticating entity will automatically provide the user and/or the user's computer with an access key, in one embodiment, allowing the user to access his/her encrypted data.

12 Claims, 6 Drawing Sheets

AUTOMATIC RECOVERY OF FORGOTTEN PASSWORDS

REFERENCE TO RELATED PATENTS

This application is related to U.S. Pat. No. 5,768,373, entitled "Method for Providing a Secure Non-reusable One-Time Password."

FIELD OF INVENTION

The invention relates to computer security and particularly to computer security when a user has lost or forgotten the user password.

BACKGROUND OF THE INVENTION

Many personal computers (PCs) or workstations allow a user to secure data and information stored in a computer by requiring the user to enter a password previously defined by the user. The password is used to limit access to data stored on the computer.

In one type of security system encryption is used to transform "plaintext" data into a form unintelligible to anyone who does not have a decryption key. Data is thus kept private and away from those for whom it is not intended. The password may serve as a decryption key or a means for obtaining the decryption key.

To regain access to encrypted data, the user, often at logon, must type in the user password exactly as he/she previously defined it. The user password is then used to decrypt the data. However, without the user password, access to the data cannot generally be gained.

In a centralized network situation, when a user forgets his/her password, a system administrator can give the user access to his/her files by overriding the user password function through a backdoor access, or, if passwords are centrally stored, obtaining the password for the user. However, with a freestanding PC or workstation, unlike with networks, there is no centralized administration or access to passwords, and loss of a user password in an independent PC or workstation situation can be devastating.

Typically, if a user forgets the user password, for unlocking all files the entire computer product must be removed/replaced and/or the data encrypted with the password must be erased since it is unintelligible without a decryption key. Generally, loss of a user password in such a situation will cause the user to lose a significant amount, if not all, of the user's protected data.

Thus, it is desirable to develop a system which allows a user to gain access to his/her computer data even if the user has forgotten the password. However, because data security is of prime significance to users who use passwords, it is also desirable to allow a user to override password protection to data in a way that does not significantly compromise the security of the data.

SUMMARY OF THE INVENTION

In accordance with the invention a method of securely and automatically authenticating a user is disclosed. Bona fides are entered for a user, hashed, and then stored at an authenticating entity, remote from the user's computer. When a user forgets his/her password, the user enters his/her bona fides, which are again hashed on the user's system, and then securely transmitted to the authenticating entity. The authenticating entity compares the received, hashed bona fides to those previously stored at the authenticating entity. If the comparison shows that the values match or otherwise appropriately correlate, the user will be authenticated. The user will then be provided with the means to access his/her encrypted data. In other words, once authenticated the authenticating entity will automatically provide the user and/or the user's computer with an access key, in one embodiment, allowing the user to access his/her encrypted data.

Such a method is advantageous in that it can minimize the live-human resources dedicated at the authenticating entity to responding to lost-password inquiries. In fact, in utilizing the present invention, no human need be present at the authenticating entity to grant a user access to his/her data, and yet the granting of such access is granted remains secure.

BRIEF DESCRIPTION OF THE DRAWINGS

The present invention is described with respect to particular exemplary embodiments thereof and reference is accordingly made to the drawings in which.

DETAILED DESCRIPTION

Figure 1:
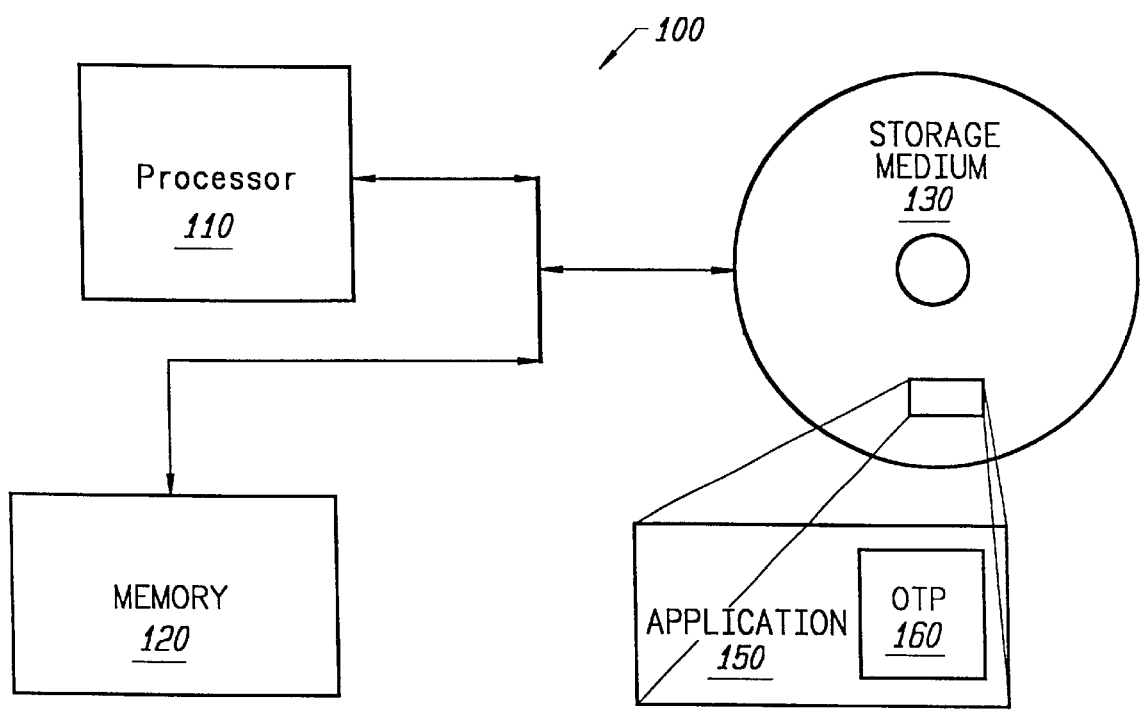
FIG. 1 is a block diagram of a computer system in accordance with one embodiment of the invention.

FIG. 1 shows a first computer system 100, having at least a processor 110, a memory 120 such as RAM, and a non-volatile storage medium 130. Storage medium 130 may include one or more machine-readable media including semiconductor memories (e.g., EEPROM), optical and magnetic media (e.g., floppy disks, hard disks, CD-ROM), etc. In order to aid the user in securing access to data stored on computer system 100, various application/logon programs have been developed. As shown in FIG. 1, an application 150 resides in storage medium 130. In an alternative embodiment, application 150 resides in memory 120. Application 150 interacts with the user and the system to secure data access to the user and those designated by the user.

One embodiment of the invention is a portion of an instruction set, shown as a one time password (OTP) program 160 in FIG. 1, residing in storage medium 130 as part of application 150, which is executed by processor 110. OTP program 160 interacts with application 150 to secure data access (discussed in more detail below). Alternatively, OTP program 160 may reside in memory 120.

Figure 2:
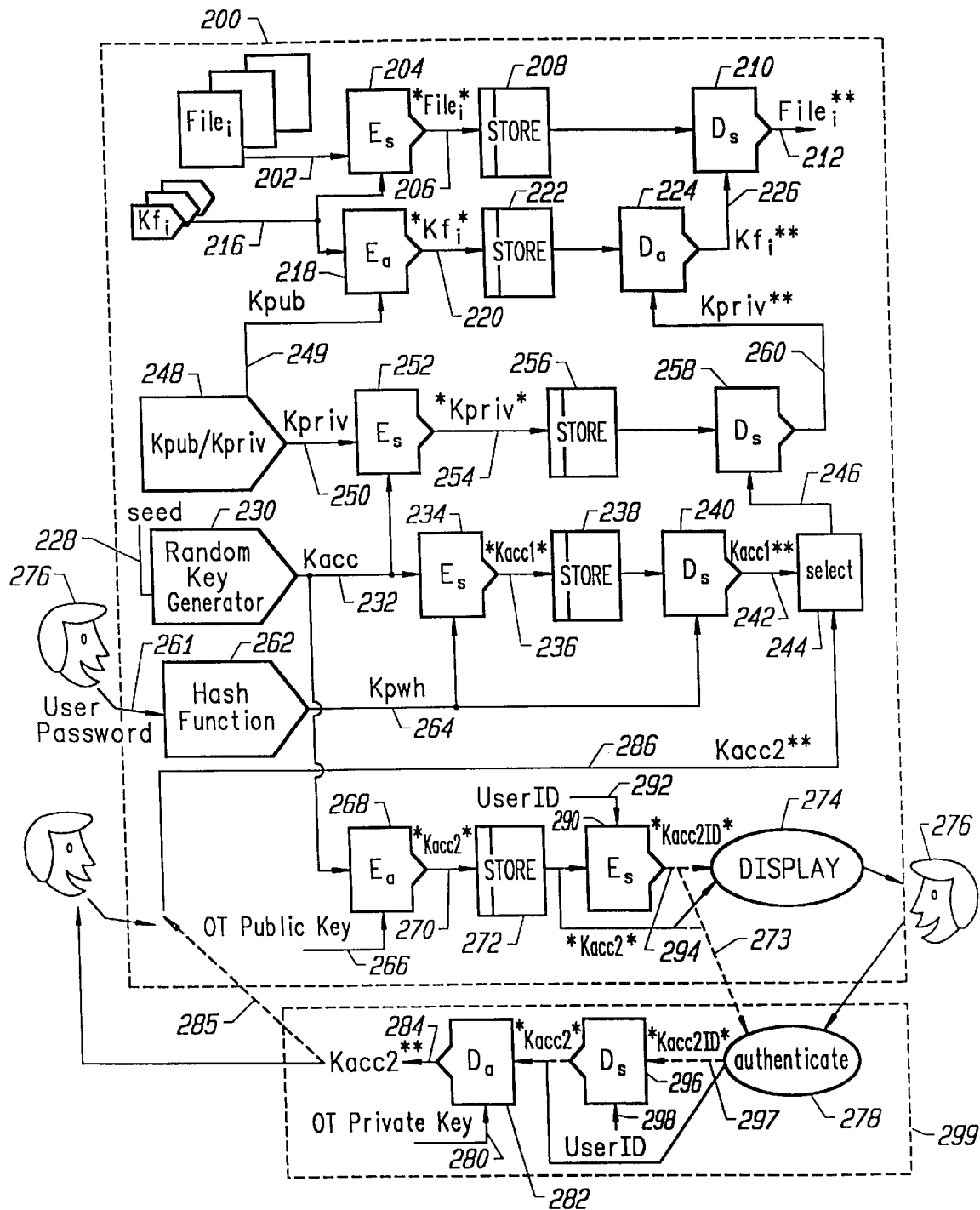
FIG. 2 is a diagram of a security system in accordance with the invention.

Referring to FIG. 2, a OTP mechanism is described. In a computer system 200, each file, $File_i$, is associated with an encryption unit 204 and with a file key $K_{fi}$, i=1 . . . n. Encrypting unit 204 receives plaintext file data on line 202 and encrypts file data to create encrypted *$file_i$* on line 206. Items bound by a pair of asterisks are used herein to indicate the items are encrypted. A file encryption key, $K_{fi}$, is supplied as an encryption key to the key input of encrypting unit 204 on line 216.

The encrypted *$file_i$* is stored in a region 208 of a non-volatile storage means such as a hard disk. To retrieve an intelligible version of the stored *$File_i$*, the *$file_i$* data is extracted from storage region 208 and supplied to decrypting unit 210. The encryption/decryption algorithm performed by units 204/210 is preferably a symmetric one, meaning that the same key $K_{fi}$ used for encryption by encrypting unit 204 must be used by decrypting unit 210 for decryption.

If a plaintext version of the file encryption key $K_{fi}$ is stored on the nonvolatile storage means, system security will be compromised if an unauthorized person discovers its location. Thus, the file encryption key $K_{fi}$ is supplied to encrypting unit 218 and an encrypted version, $*K_{fi}*$, is produced on line 220. $*K_{fi}*$ is stored in region 222 of non-volatile storage means. In this manner, if an unauthorized person discovers region 222, the plaintext version of key $K_{fi}$ remains unavailable.

In order to encrypt $K_{fi}$, an encryption key also needs to be supplied to encrypting unit 218. Thus, a user public key $K_{pub}$, is produced on line 249 by public-private key generator 248. The encryption/decryption algorithm utilized by encryption unit 218 is not a symmetric one, meaning that a key other than $K_{pub}$ will be necessary to decrypt the encrypted $*K_{fi}*$. Thus public-private key generator 248 also generates a second key, $K_{pub}$, for decrypting data encrypted in unit 218.

Public-private key generator 248 generates keys in accordance with a public-key cryptography system, a general description of which will here be useful. In public key cryptography, each encrypting/decrypting entity utilizes a pair of keys: a public key, which is published, and a private key, which is kept secret. The public key is used to encrypt the data, but only the private key can decrypt the data. Thus, once encrypted, data is available only to the private key holder. In this manner, the public key and the private key work together as a complementary pair. The most common public-key cryptography system is RSA public-key cryptography, which is generally known in the art and, in fact, has become a de facto standard. General information about RSA public-key cryptography can be found in U.S. Pat. No. 4,405,829.

Using a user public key to encrypt $K_{fi}$ is beneficial in that it allows files to be accessible to more than a single user. For example, if $File_i$ is owned by user1, user1 can designate user1, user2 and user3 to have access to $File_i$. User1 would encrypt $K_{fi}$ three separate times: once with each of user1's, user2's, and user3's public keys ($K_{pub1}$, $K_{pub2}$, and $K_{pub3}$) to form $*K_{fi}-1*$, $*K_{fi}31\ 3*$, and $*K_{fi}-3*$, respectively.

However, once $K_{fi}$ is encrypted in encryption unit 218, e.g., to obtain $*K_{fi}-1*$, using user 1's public key, $K_{pub1}$, only the user's private $K_{priv1}$, applied to decryption unit 224, will be able to recover a useable form of $K_{fi}$. Thus, user1 can only access a file using user1's private key ($K_{priv1}$) and user2 can only access the same file with $K_{priv2}$.

Generally, encryption/decryption units 218/224 operate in accordance with an asymmetric algorithm such as those found in RSA Corp.'s Bsafe Library™, a publicly available product. Further, the public-private key pair generated by public-private key generator 248 may generally be between 360 and 2048 bits in length. However, use of at least 768 bits is preferred because use of any fewer bits may result in easily penetrable security.

However, even using asymmetric algorithms, if any user's $K_{priv}$ is stored on the storage medium and is not itself encrypted, data security will again be compromised if an unauthorized person discovers its location. Thus, each $K_{priv}$ is supplied on a line 250 to an encryption unit 252, and an encrypted version, $*K_{priv}*$, is produced on line 254. $*K_{priv}*$ is then stored in storage region 256 of non-volatile storage means and is unreadable by unauthorized persons.

When a user desires to access a file, the user must extract $*K_{priv}*$ from storage region 256 and decrypt it in decryption unit 258, producing decrypted $K_{priv}$. Items that have been previously encrypted and thereafter decrypted are indicated as being followed by a pair of asterisks. $K_{priv}$ is then applied on line 260 to decryption unit 224, resulting in decrypted key $K_{fi}**$. $*File*$ is then extracted from storage region 208 and $K_{fi}$ is applied to decryption unit 210 and File is produced, the desired result.

Returning to $K_{priv}$ encryption at encryption unit 252, to encrypt $K_{priv}$, an access key, $K_{acc}$ is supplied on line 232 to encryption unit 252. $K_{acc}$ is produced on line 232 by a random key generator 230 and in one embodiment $K_{acc}$ is 128 bits in length. Further, in one embodiment of the invention, random key generator 230 is a random number generator. A suitable random number generator can be found in RSA Corp.'s Bsafe Library™, although other random number generators are also suitable. Generally, random number generators have to be "seeded" with some sort of initial vector (or "seed") 228. Such a seed in one embodiment of the invention may be produced using timers (e.g., the length of time it takes the user to type a certain number of keystrokes). Other embodiments may use other well known random seed generators to produce such a seed.

The encryption/decryption algorithm performed by units 252 and 258 is symmetric. Thus, since $K_{acc}$ is supplied to encryption unit 252, $K_{acc}$ must also be supplied to decryption unit 258. Yet, as with other keys, if $K_{acc}$ is stored in plaintext form in non-volatile storage means, and sometime later an unauthorized person discovers the location of $K_{acc}$, the security of data will be compromised as other encrypted keys will then become accessible. Therefore, access key $k_{acc}$ is supplied on line 232 to encrypting unit 234 which operates according to well-known symmetric encryption/decryption algorithms such as "Blowfish", which can generally be found in Bruce Schneier, Applied Cryptography (2d.Ed. 1995). The resulting encrypted signal $*K_{acc1}*$ produced on line 236 is stored in storage region 238. The key signal that is applied to encrypting unit 234 on line 264 is $K_{pwh}$ and is produced by hashing unit 262 from a user-supplied password on line 261.

"Hashing" is generally the using of an algorithm to take a variable size input and produce a unique fixed-length identifier representative of the original input (here, the user password). One hash algorithm, MD5, or message digest 5, is generally known in the art, and is suitable for hashing a user password. Other algorithms are also generally known and are also suitable for hashing a user password in system 200. Often hash functions are thought to take a large block of data and reduce it to a smaller block. However, because the user password can vary from a few characters to up to 99 bytes in one embodiment, hash function 262 may produce a larger or smaller block of data than a given input (the user password), but it will return a password hash ($K_{pwh}$) of consistently fixed length. In one embodiment using the MD5 hash function, such fixed length is set to 16 bytes.

To retrieve the access key, $k_{acc}$, the user must enter the correct password on line 261 into hashing unit 262. The resulting signal, $K_{pwh}$, on line 264 is applied to decryption unit 240. The resulting, decrypted access key on line 242 is now referred to as $K_{acc1}$. This decrypted access key $K_{acc1}$ is passed through selector 244 and supplied on line 246 to decryption unit 258 to obtain decrypted $K_{priv}$ and, ultimately, to obtain decrypted $File_i$ information.

As can be seen from the above discussion, access to secured files is ultimately through entry of the user password 261. That is, user password 261 is entered into user system 200 and is applied to hash function 262 to obtain $K_{pwh}$. $K_{pwh}$ is used to decrypt $*K_{acc1}*$ to obtain $K_{acc1}$. $K_{acc1}$ is then used to decrypt $*K_{priv}*$ to obtain $K_{priv}$, which is used to obtain decrypted $K_{fi}$ and ultimately decrypted $File_i$. The user password 261 is not stored anywhere in the computer system. If the password were so stored, the security of the system would be compromised by anyone discovering its location. Yet if the user forgets his/her password, access to decrypted $File_i$ cannot be obtained through the above-described method.

Thus, further in accordance with the invention, when $K_{acc}$ is encrypted at encrypting unit 234, it is also passed through encrypting unit 268 to form a second encrypted access key $*K_{acc2}*$ on line 270. $*K_{acc2}*$ is stored in storage region 272. Encrypting unit 268 operates according to an asymmetric encryption/decryption algorithm, such as those found in RSA Corp.'s Bsafe Library™, meaning that different keys are used for encryption and decryption, respectively. A one-time (OT) public key is applied on line 266 to encrypting unit 268. A companion, but different OT private key 280 will be later applied to a companion decrypting unit 282. The OT public key ($K_{otpub}$) and OT private key ($K_{otpub}$) are generated in accordance with a public-key cryptography system and preferably in accordance with RSA public-key cryptography, discussed previously. Further, OT public-private key pairs are preferably 1024 bits in length, but other lengths are also suitable.

The OT private key is held by an authenticating entity 299, remote from user system 200, in a secure location. In one embodiment, this authenticating entity 299 is referred to as a "help desk". The help desk can comprise a human at a terminal or it can be an automated entity. The OT public key is stored on the user's computer system 200. The OT public-private key pair is generated, in one embodiment, before distribution of system 200 to the user, allowing for storage of OT public key on user system 200. In other embodiments the OT public-private key pair is generated by user system 200 subsequent to distribution. In such an embodiment, OT private key would be communicated via a secure channel to authenticating entity 299 along with various identifying information.

When the user forgets his/her password, a one-time password mechanism is activated to read the encrypted signal $*K_{acc2}*$ stored in storage region 272 and to output that $*K_{acc2}*$ signal, for example, to a display monitor 274. User 276 reads the displayed information and communicates it by a secured channel to the authenticating entity 299. Such communication with the authenticating entity can be obtained via verbal telephone communication. In an alternate embodiment, the fetched data $*K_{acc2}*$ is transmitted through a secure channel 273 via modem or internet to the authenticating entity 299, in which case display of $*K_{acc2}*$ may be unnecessary. In either case, user 276 must supply additional authenticating information to the authenticating entity 299 to prove that user 276 is whom he or she claims to be. An example is randomly selected personal information about the user such as date of birth and/or mother's maiden name. The user 276 may demand that the authenticating entity 278 also prove that it is whom it claims to be.

Optionally, system 200 further includes encryption unit 290 and decryption unit 296, to further ensure user authentication. Rather than having $*K_{acc2}*$ go directly from storage region 272 to display 274, $*K_{acc2}*$ is encrypted in encryption unit 290 using the user's UserID (e.g., a logon name) as the encryption key for a symmetric encryption algorithm. $*K_{acc2ID}*$ results and is displayed for user 276 communication, or is otherwise communicated, to authenticating entity 299. Authenticating entity 299, then, in addition to requesting identifying information from the user 276 will request the user's UserID. The authenticating entity decrypts $*K_{acc2ID}*$ using the UserID conveyed. Thus, because a user must supply UserID information in addition to other identifying information, system security is further enhanced.

If the UserID's match, $*K_{acc2ID}*$ is decrypted in decrypting unit 296 to recover $*K_{acc2}*$, which in turn is applied to decrypting unit 282. If decrypting unit 296 is not utilized, $*K_{acc2}*$ is passed directly to decrypting unit 282 subsequent to user authentication 278. The authenticating entity 299 applies its OT private key to the key-input 280 of unit 282. The output 284 of unit 282 is the decrypted access key $K_{acc2}$ which is then returned verbally to the user 276 for entry into system 200 in one embodiment. Alternatively, $K_{acc2}$ is returned directly via a secure communication channel 285 to user system 200. In either case, $K_{acc2}$ is applied to line 286 of the user's system. This returned, secondary access key $K_{acc2}$ is then passed through selector 244, which selects between $K_{acc1}$ and $K_{acc2}$, and $K_{acc2}$ used to unlock the remainder of the system.

Immediately thereafter, random key generator 230 is activated to generate a new access key $K_{acc}$. The user is prompted to enter a new password 261. The securing process repeats all over again.

User system 200 shown in FIG. 2 may be implemented as OTP program computer code and stored on a non-volatile storage medium 130 (FIG. 1) such as a floppy disk or hard disk. In such an embodiment, storage regions 238, 256, and 272 may be represented by a logon record data structure. Such computer code, when activated may be transferred to memory 120 (FIG. 1) such as RAM and executed by a processor 110 (FIG. 1). Alternatively, user system 200 may be implemented as dedicated hardware.

Figure 3:
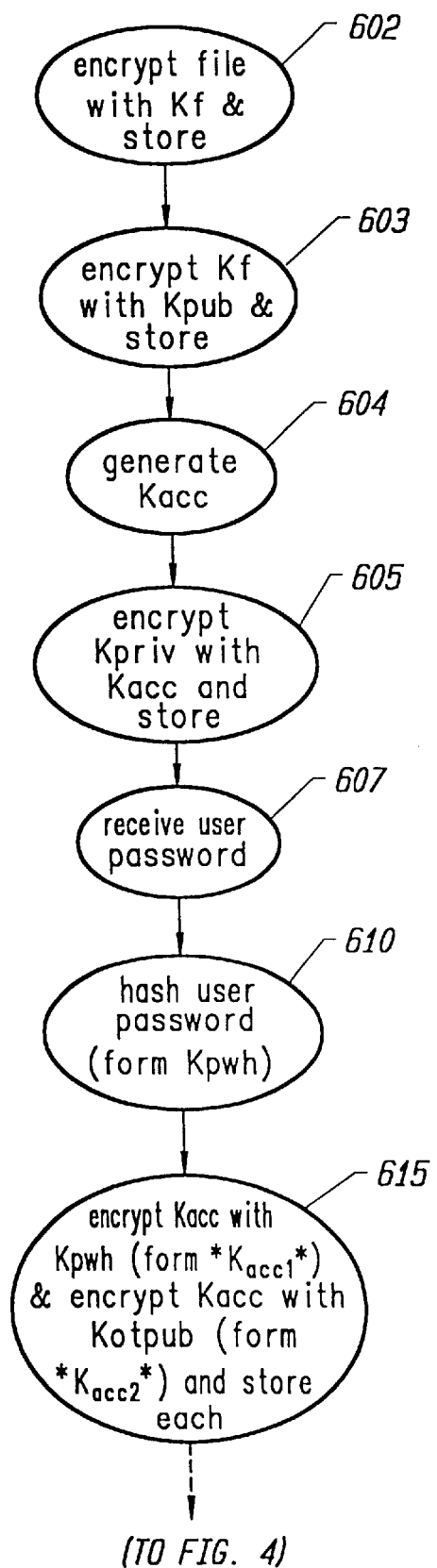
FIGS. 3 and 4 together show a flow diagram in accordance with one embodiment of the invention.

FIG. 3 shows the steps followed for securing data and an access key. $File_i$ data is encrypted with $K_{fi}$ in step 602 to form $*file_i*$ which is stored. $K_{fi}$ is encrypted with $K_{pub}$, step 603 to form $*K_{fi}*$ and stored. In step 604, access key, $K_{acc}$, is generated, and, in step 605, $K_{priv}$ is encrypted with $K_{acc}$ and stored. The user password, received in step 607, is hashed, step 610, and $K_{acc}$ is encrypted with each $K_{pwh}$ and $K_{otpub}$ in step 615 forming $*K_{acc1}*$ and $*K_{acc2}*$, respectively. Note that while FIG. 3 shows step 604 following step 603, in other embodiments step 604 can precede steps 602 or 603 or can be performed simultaneously with either steps 602 or 603. Likewise, steps 607 and 610 can occur any time before, or simultaneously with, any of steps 602–605, provided step 610 follows step 607.

Figure 4:
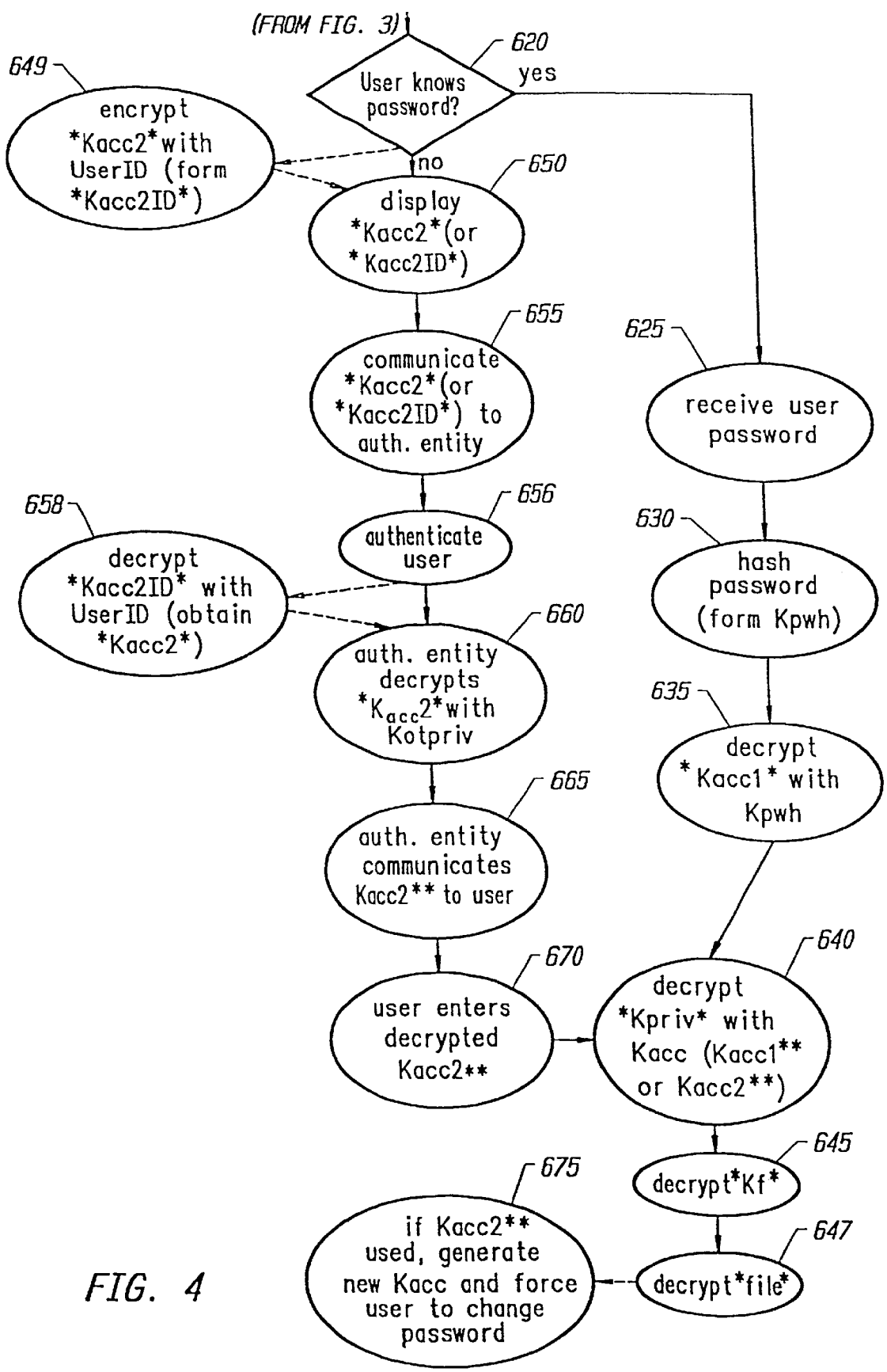

When the user attempts to regain data access later, referring to FIG. 4, if the user knows his password, step 620, then the user enters his password, step 625, the hash of the entered user password is taken, step 630, $*K_{acc1}*$ is decrypted with $K_{pwh}$, step 635, and $*K_{priv}*$ is decrypted with $K_{acc1}**$, step 640. $*K_{fi}*$ is then decrypted, step 645, and $*file_i*$ can be decrypted, the desired result, step 647.

However, if at step 620 the user does not know his password when he attempts to gain data access, $*K_{acc2}*$ is displayed, step 650. Alternatively, in one embodiment, $*K_{acc2}*$ may optionally be further encrypted with UserID, to form $*K_{acc2ID}*$, step 649, for better user authentication, and then $*K_{acc2}*$ is displayed in step 650. Following display, the user may then communicate the encrypted $*K_{acc2}*$ to the authenticating entity, step 655. Note, as previously discussed, some methods of communication may not require display of $*K_{acc2}*$, in which case step 650 can be bypassed in some embodiments of the invention. Upon receiving the user's communication, authenticating entity authenticates the user, step 656, by requesting certain identifying information of the user. Optionally, if step 649 was performed, authenticating entity will decrypt $*K_{acc2ID}*$ with the UserID, obtained by authentication entity from the user in step 656, to recover $*K_{acc2}*$, step 658. In step 660, the authenticating entity decrypts $*K_{acc2}*$ with $K_{otpriv}$, the OT private key. The authenticating entity then communicates the decrypted $K_{acc2}$ to the user in step 665, and the user enters the decrypted $K_{acc2}$ on his or her system, step 670. (Note here again that the method of communication may be by directly transmitting the decrypted $K_{acc2}$ to the user's system.) By receiving a decrypted $K_{acc2}$, $*K_{priv}*$ can be decrypted, step 640. $*K_{fi}*$ is then decrypted, step 645, and file access, step 647, is obtained.

If $*K_{acc2}*$ was decrypted by the authenticating entity with the OT private key, then, in step 675, a new $K_{acc}$ will be automatically generated and the user will be prompted to change the user password. In this manner, a one-time password feature is enabled that does not significantly compromise data security and does not require decrypting any encrypted data without a decryption key. Further, because all $File_i$ are encrypted with a $K_{fi}$ and not $K_{acc}$, the system in accordance with the invention is transparent to the files, $File_i$; that is, files do not have to be decrypted and/or re-encrypted when the user loses his or her password.

Authenticating the User

As described with reference to FIGS. 2 and 4, when a user forgets his/her password, the user must contact a "help desk," or authenticating entity. The authenticating entity must authenticate the user before providing that user with the means to access his/her data. As described, although the encrypted access key ($*K_{acc2}*$) can be directly sent to the authenticating entity over a modem or internet, to actually authenticate the identity of the user will typically require a live human asking the user certain questions. Such querying of the user is usually done via a telephone conversation. Such authentication can result in a large percentage of "help desk" resources being dedicated to helping users who have forgotten their passwords, a frequent occurrence.

In order to minimize the necessity of having a live human at the "help desk" interact with the user who has forgotten his password, a method in accordance with the invention provides for the automatic authentication of users.

Figure 5:
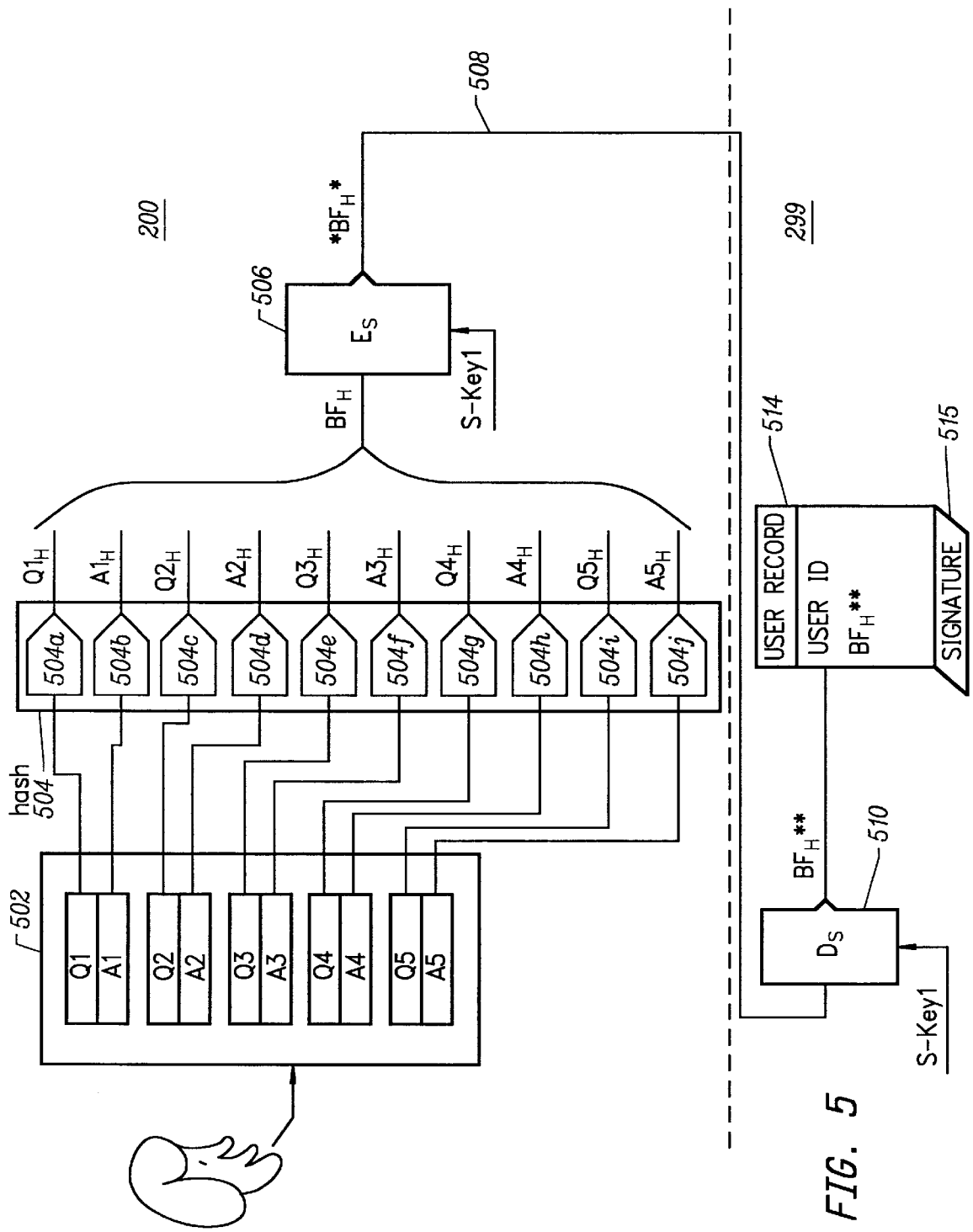
FIGS. 5 and 6 illustrate in block diagram format a system and method for automatically authenticating a user in accordance with the invention.

Referring to FIG. 5, when a user 276 is first created, or established, with the authenticating entity 299, the user 276 is requested to provide the authenticating entity 299 with identifying information 502, referred to herein as "bona fides." Such bona fides should contain several facts that are known only to the user. Preferably these facts will also not be easily identifiable from public records. For instance, such facts may include the name of the user's first girlfriend/boyfriend, the user's favorite golf hole, or the name of the user's first childhood pet. Although five facts are shown in the bona fides 502 in FIG. 5, where each fact includes a question Q and an answer A, it is to be understood by those of skill in the art that more or fewer facts could be included and that the number five was selected for illustrative purposes only.

In one embodiment each bona fide is entered in the form of a question and an answer. For instance, a bona fide fact may be entered as follows:

"Q: First girlfriend?"

"A: Lola"

Since each bona fide should typically contain facts known only to the user, in one embodiment of the invention the user will devise both the questions and the answers. In other embodiments, however, the user system 200 or authenticating entity 299 may provide the questions to the user.

If the questions and answers are stored in text form, either at the user's system or at the authenticating entity, anyone gaining access to the user's system 200 or the authenticating entity 299 may be able to impersonate the user. Even if only the questions are stored in text form and the answers are encrypted or otherwise encoded, an unauthorized individual may be able guess the answers to the questions. Therefore, in one embodiment, both the question and the answer to each bona fide are hashed with hash functions 504a–504j (collectively, hash function 504). In some embodiments, each hash function 504a–504j is the same hash function, e.g., MD5. In other embodiments, each hash function 504a–504j is distinct from the others. As well, although in FIG. 5, each question and answer are hashed separately, in some embodiments each question and answer are hashed together, resulting in one hash output for each question-answer pair.

Because both the questions and answers for each bona fide are hashed, at authentication time the user will have to enter both the question and answer. Hence, because user's are apt to forget their questions, at the time of entering the question and answer for the bona fide, the user may, in some embodiments, also enter a hint to remind him- or herself of the bona fide. For instance, "Q: First girlfriend?"

"A: Lola"

"Hint: 10th Grade"

The hints may be stored in text form either on the user's computer system 200 or at the authenticating entity 299.

Of course, if the authenticating entity is providing the questions, such hints may be unnecessary in other embodiments of the invention. Nonetheless, in such an embodiment where the questions are provided by and/or stored at the authenticating entity, the questions should be stored in an encrypted format and/or transmitted over a secure channel using encryption (as will be described below) to protect the secrecy of the questions. Otherwise, imposters could gain access to the questions and attempt to guess the answers.

Once the user has entered his/her bona fides 502 and they have each been hashed by hash function 504, the hashed bona fides $Q1_H$–$Q5_H$ and $A1_H$–$A5_H$, collectively referred to as $BF_H$, are sent to the authenticating entity 299. To maintain the secrecy of the bona fides, however, a secure communication line is set up between the user's system 200 and the authenticating entity 299. In one embodiment, the set up of such a secure communication line is automatic and uses a protocol such as DCOM, CORBA, or SSL. These protocols as well as others are known in the art.

In some embodiments, the Diffie-Hellman protocol or other public key algorithm is used to establish a secure channel and to create a unique session key. In accordance with the Diffie-Hellman protocol, such a session key can be independently established at both the user's system 200 and the authenticating entity 299 without transmitting the session key itself between the two entities.

The session key, S-Key1, is used in symmetric encryption unit 506 to encrypt the hashed bona fides, $BF_H$. The encrypted and hashed bona fides, $*BF_H*$, are then transmitted to the authenticating entity 299 over the secure channel 508. In this manner, so-called "replay" attacks are minimized. In other embodiments, other methods of establishing a secure channel are also acceptable, and those given are meant as examples only and are not intended to limit the scope of the invention.

In an alternative embodiment, $BF_H$ is not communicated over a secure channel as described above, but is instead communicated to the authenticating entity 299 by the user via telephone. In such a case, encryption unit 506 used with the Diffie-Hellman protocol described would not be necessary.

When $*BF_H*$ is received at the authenticating entity 299, $*BF_H*$ is decrypted with symmetric decryption unit 510, using the same session key, S-Key1 (if required by the secure channel protocol utilized), the result is decrypted hashed bona fides, $BF_H$. The set of decrypted, hashed bona fides, $BF_H$, is then stored in a user record 514.

In order to prevent $BF_H$ from being accessed and/or changed while stored at the authenticating entity, $BF_H$ is further protected. At a minimum, the user record 514 is digitally signed, as shown by attached signature 515, and will be understood by those of skill in the art. In other embodiments, each bona fide can be individually digitally signed. Still other forms of security, such as encrypting $BF_H**$ can also be used in other embodiments of the invention. Without at least providing a digital signature, the bona fides would be accessible and/or changeable to unauthorized individuals located at the authenticating entity. Digitally signing the bona fides prevents user authentication when the stored bona fides have been unauthorizedly altered.

In addition to $BF_H$, user record 514 will also include other information specific to the user, such as a UserID. The UserID may be useful for indexing the user records.

Figure 6:
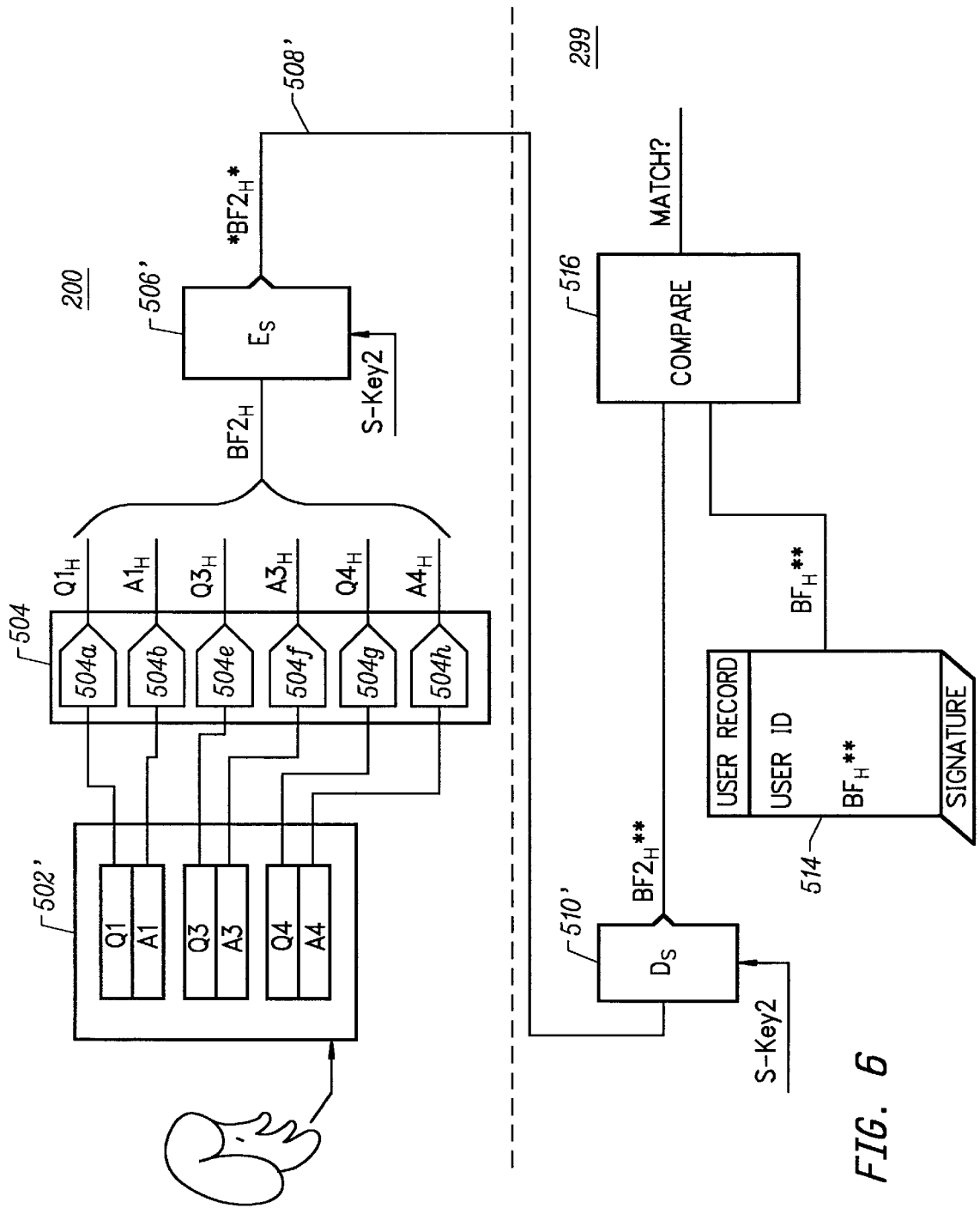

Referring to FIG. 6, when the user forgets his/her password, the user is prompted at computer 200 to enter his/her bona fides. The user may enter all of the bona fides he/she originally established at user set-up time, or the user may enter a subset of those bona fides. In FIG. 6, a subset of bona fides 502' is shown for illustrative purposes. In some embodiments, the user will select the subset while in other embodiments the authenticating entity will select the subset.

The bona fides 502' are hashed with the same hash functions 504 as were used to initially hash the user's bona fides in FIG. 5. Again, each question and answer are hashed. Although the bona fides are hashed individually, $BF2_H$ is used to collectively refer to the subset of entered and hashed bona fides.

Again, once the user has entered bona fides 502' and they have each been hashed by hash function 504, the hashed bona fides, $BF2_H$, are sent to the authenticating entity 299. A secure communication line 508' is again set up between the user's system 200 and the authenticating entity 299 in a manner similar to that described above. If the Diffie-Hellman protocol is used, a session key, S-Key2 is established for security purposes, and $BF2_H$ is symmetrically encrypted by encryption unit 506', resulting in $*BF2_H*$. In some embodiments, the algorithm used by encryption unit 506' is the same as that used at user creation by unit 506. It should again be understood that any method of establishing a secure communication channel is contemplated as within the scope of the invention.

Once $*BF2_H*$ has been received via secure line 508' by the authenticating entity 299, $*BF2_H*$ is decrypted with decryption unit 510', using the same session key, S-Key2, as was used for encryption (if required by the secure channel protocol utilized). The decrypted hashed bona fides, $BF2_H**$ are then provided to comparison unit 516.

If the user record 512 and/or individual bona fides are digitally signed, the comparison unit 516 verifies that the stored information has not been altered. If the stored information has been encrypted, the information is decrypted as is understood in the art. $BF2_H$ is then compared with the stored $BF_H$ in comparison unit 516. Each individual hashed bona fide in the subset $BF2_{H-S}$ is compared to the hashed bona fides stored in user record 514. If a minimum number of matches are obtained then the user is authenticated. For instance, if three bona fides are entered, the authenticating entity may require that only two match those stored. In other embodiments, all of the bona fides in the subset entered must be matched.

If the user is authenticated, the access key, $K_{acc2}$ will be decrypted, as described with reference to FIGS. 2 and 4. If no match is found, the user will not be provided with a one-time password such as $K_{acc2}**$.

When all transmissions are performed through modem or internet, including transmission of $*K_{acc2}*$ and $K_{acc2}$ between system 200 to system 299 as well as transmission of hashed and encrypted bona fides, the need for a live human at a help desk is eliminated. The user can be automatically authenticated by the authenticating entity, and then the authenticating entity can automatically provide the means necessary (e.g., $K_{acc2}$) for the user to gain access to his encrypted data. Because forgotten passwords are a common occurrence, such automation will significantly free-up help desk personnel and resources.

Moreover, hashing of bona fides as well as encrypting the resulting hash provides an additional measure of security. Help desk personnel will never need to access a user's personal information, and therefore, the risks attendant in allowing help desk personnel access to user information and subsequently attempting to gain access to a user's data are significantly reduced.

To further enhance security, the user's bona fides can be required to be changed based on certain aging characteristics. For instance, the user can be required to change his/her bona fides after those bona fides have been existence for a given time period, e.g., 2 months. Alternatively, the user may be required to change his/her bona fides after they have been used for authentication purposes a particular number of times.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method of granting a user access to encrypted data stored on a user's computer, said user and said user's computer remote from an authenticating entity, comprising the steps of:

automatically authenticating said user by an authenticating computer at said authenticating entity;

upon authentication, automatically providing an access key to said authenticated user, enabling said user to access said encrypted data stored on said user's computer.

2. The method of clam 1, wherein the step of automatically authenticating a user, comprises the steps of:

storing user-identifying information in said authenticating computer, resulting in stored user-identifying information;

receiving, by said authenticating computer from said user, second user-identifying information; and comparing, by said authenticating computer, said second user-identifying information to said stored user-identifying information, wherein if said second user-identifying information correlates to said stored user-identifying information said user is authenticated.

3. The method of claim 2, wherein said user-identifying information includes a hashed bona fide.

4. A method of authenticating a user, comprising the steps of:
storing a bona-fide hash at an authenticating entity remote from said user, resulting in a stored bona-fide hash;
receiving, by said authenticating entity, a second bona fide hash from said user;
comparing, by said authenticating entity, said second bona-fide hash with said stored bona-fide hash; and
providing, by said authenticating entity, an access key for enabling said user to access encrypted data stored on said user's computer if said second bona-fide hash correlates to said stored bona-fide hash, wherein said user's computer is remote from said authenticating entity.

5. The method of claim 4, wherein said steps of receiving, comparing, and providing occur without human intervention at said authenticating entity.

6. The method of claim 4, wherein said step of storing farther includes protecting said bona fide hash with at least a digital signature.

7. The method of claim 4, wherein said step of receiving includes receivingsaid second bona fide hash from secure channel, wherein said secure channel includes encryption of said second bona fide hash.

8. A method of authenticating a user, comprising the steps of:
(a) receiving, by a user's computer, a set of bona fides from said user;
(b) hashing, by said user's computer, said set of bona fides resulting in a set of bona-fides hashes;
(c) securely communicating said set of bona-fides hashes to an authenticating entity remote from said user's computer;
(d) storing said set of bona-fides hashes at said authenticating entity resulting in a stored set of bona-fides hashes;
(e) receiving, by said user's computer, at least a subset of said set of bona fides said user;
(f) hashing, by said user's computer, said subset of bona fides resulting in a second set of bona-fides hashes;
(g) securely communicating said second set of bona-fides hashes to said authenticating entity;
(h) comparing, by said authenticating entity, said second set of bona-fides hashes with said stored set of bona-fides hashes, wherein if said second set of bona-fides hashes correlates to said stored set of bona-fides hashes the user is authenticated; and
(i) if said user is authenticated, communicating, by said authenticating entity to said user's computer, an access key to allow said user to access encrypted data on said user's computer.

9. The method of claim 8, wherein said step of storing includes protecting said set of bona fides hashes by at least digitally signing said set of bona fides hashes.

10. The method of claim 8, wherein said steps (h) and (i) occur without human intervention at said authenticating entity.

11. A system for granting a user access to encrypted data stored on a user's computer when the user has forgotten his/her password, comprising:
a hash unit, located at said user's computer and having an input for receiving a user bona fide and having an output for carrying a bona fide hash;
a storage record located at an authenticating entity, said storage record including a stored bona fides hash, said authenticating entity remote from said user's computer and couplable to said user's computer with a secure channel;
a comparison unit, located at said authenticating entity, said comparison unit having a first input coupled to receive said bona fides hash from said secure channel, having a second input coupled to receive said stored bona fides hash, and having an output for carrying a signal indicative of whether the user has been authenticated; and
an access key provider, located at said authenticating entity and activated by said comparison unit output, said user gaining access to said encrypted data upon receipt of an access key from said access key provider.

12. A system for granting a user access to encrypted data stored on a user's computer when the user has forgotten his/her password, comprising:
an authenticating entity remotely located from said user's computer, said authenticating entity comprising:
means for automatically and securely authenticating said user using user bona fides; and
means for automatically providing a user access to his/her encrypted data.

* * * * *